US006902446B1

United States Patent
Healey

(10) Patent No.: US 6,902,446 B1
(45) Date of Patent: Jun. 7, 2005

(54) DC MOTOR WITH INTEGRAL CONTROLLER

(75) Inventor: Robert W. Healey, Tulsa, OK (US)

(73) Assignee: Brunswick Corporation, Lake Forest, IL (US)

( * ) Notice: Subject to any disclaimer, the term of this patent is extended or adjusted under 35 U.S.C. 154(b) by 81 days.

(21) Appl. No.: 10/408,741

(22) Filed: Apr. 7, 2003

(51) Int. Cl.[7] ............................................. B63L 11/02
(52) U.S. Cl. ..................... 440/6; 114/144 E; 318/588; 318/599
(58) Field of Search .................... 440/1, 6, 7; 318/257, 318/588, 599; 114/144 E

(56) References Cited

U.S. PATENT DOCUMENTS

| | | | |
|---|---|---|---|
| 3,814,961 A * | 6/1974 | Nelson et al. ................. | 440/6 |
| 3,954,081 A * | 5/1976 | Blake ........................... | 440/6 |
| 3,954,082 A * | 5/1976 | Roller et al. ................... | 440/6 |
| 4,114,074 A * | 9/1978 | Stewart et al. ............... | 318/257 |
| 4,854,902 A * | 8/1989 | Havins .......................... | 440/7 |
| 5,525,081 A | 6/1996 | Mardesich et al. | |
| 6,590,356 B2 * | 7/2003 | Smith et al. .................. | 318/257 |
| 6,774,587 B2 * | 8/2004 | Makaran et al. ............ | 318/599 |

* cited by examiner

*Primary Examiner*—Lars A. Olson
(74) *Attorney, Agent, or Firm*—Fellers, Snider, Blankenship, Bailey & Tippens, P.C.

(57) ABSTRACT

A DC motor having a motor housing and a motor controller housed within the motor housing. In a preferred embodiment the heat producing components of the motor controller are in thermal communication with the housing such that the majority of the heat produced by such components will be readily conducted to the environment in which the motor is operating. When incorporated into a trolling motor, the motor housing of the present invention will be submerged so that controller produced heat will be dissipated into the water in which the trolling motor is operated.

11 Claims, 5 Drawing Sheets

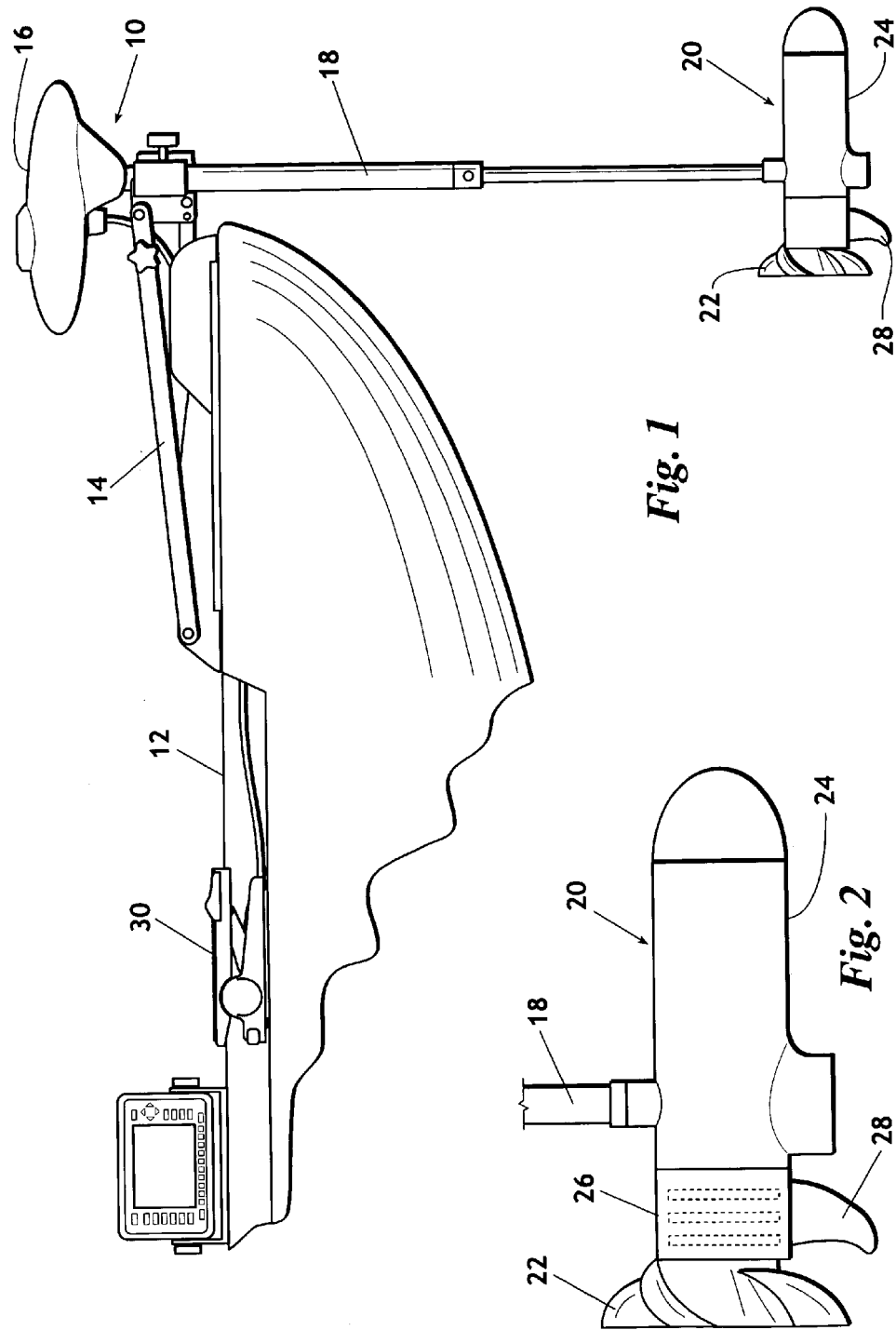

DC MOTOR WITH INTEGRAL CONTROLLER

BACKGROUND OF THE INVENTION

1 Field of the Invention

The present invention relates to DC motors. More particularly, but not by way of limitation, the present invention relates to a DC motor having a motor housing and a controller housed in the housing.

2. Background of the Invention

DC motors are well known in the art and are manufactured according to one of several constructions, i.e., permanent magnet type motors, wound-field type motors, brushless type motors, etc. Regardless of the type, when speed or torque control is required, a controller must be coupled with the motor. Presently, with permanent magnet or wound-field type motors, a separate controller is used. Normally such a controller provides a pulse width modulated output to vary the RMS voltage applied to the motor.

Trolling motors are also well known in the art and, most often, employ a permanent magnet DC motor. Generally speaking, a trolling motor is a relatively small electric motor coupled to a propeller for propelling a boat, or other water craft, at a relatively low speed. Typically, the electric motor and propeller are positioned at the bottom of a support column rotatably supported by a bracket which is attached to the boat. Traditionally, a control head located at the top of the support column houses electrical circuitry for controlling the motor. In addition, the control head may also house a steering motor and associated circuitry to provide rotation of the support column to steer of the boat.

Tolling motors are available in a variety of configurations, for example: variable speed versus discrete speed settings; automatic steering versus manual steering; a reversing controller versus a non-reversing controller, etc. In addition, manufacturers typically offer motors of different torque ratings, optional methods for controlling the motor, i.e., a hand control versus a foot pedal, and different operating voltages. Thus it can be seen that a trolling motor manufacturer wishing to appeal to a broad range of purchasers will likely have to produce a large number of individual products. Maximizing the interchangeability of components among various models can significantly reduce both recurring and nonrecurring costs, as well as significantly reduce the time and cost of bringing new models to market.

Additional concerns arise over trolling motors which use a pulse width modulated (PWM) speed control. In such motors, a solid state switch such as a bipolar transistor, MOSFET, IGBT, or the like, is switched at a variable duty cycle to control the voltage applied to the motor, and hence the speed of the motor. As is the case with any such solid state switch handling non-trivial amounts of electrical current, the dissipation of heat becomes a concern. In one school of thought, the solid state switch is placed in the control head with the control circuitry. While this location may facilitate maintenance when switches fail and may also reduce concerns during switching transients, as opposed to alternate locations, the opportunities to dissipate heat, and thus, maintain a relatively cool solid state switch, are rather poor. Typically the solid state switch is mounted on a heat sink with exposure to the environment. In such a placement, air movement around the control head is relied on to carry away the heat. Another limitation to this placement if that relatively long wires carry the electrical current from the switch to the motor. At typical PWM frequencies, this raises the potential for significant levels of electromagnetic emissions which my interfere with other on-board systems.

In another school of thought, the solid state switch is located in the motor housing which is submerged during operation of the motor. Typically, the motor housing is aluminum and the switch is in physical contact with the interior of the housing. With the housing submerged, water will be in contact with the exterior of the housing and provide a heat sink which is virtually infinite. As is well known in the art, the theoretical life of a transistor is inversely related to its operating temperature. Thus, while the transistor is much more difficult to access for repair when located in the motor housing, it should theoretically last longer, reducing the need for access anyway. Unfortunately, placing the switch remote from the controller creates its own set of problems, particularly during switching transients, such as ringing, increased rise and fall times, etc. Another advantage of locating the transistor in the motor housing is that only the gate drive, or base drive, signal is sent between the control head and the motor which dramatically reduces the switched current flowing through the conductors in the support column. Unfortunately, even this signal creates a potential for electromagnetic emissions.

Analogous problems exist with DC motors used in other applications. In general, external PWM controllers emit significant levels of electromagnetic interference, at least in part due to the wires between the controller and the motor. In addition to increased noise, the length of wiring between a controller and its motor can effect switching transients.

Furthermore, heat sinking of switching components of the controller is almost always required. Since heat produced by such components must be dissipated in the environment, controller heat sinks are often placed on an exterior surface, or other area with good air flow. On the other hand, most motor housings have a relatively large external surface area over which heat could be dissipated if heat producing components were located in the housing.

It is thus an object of the present invention to provide a DC motor which provides the advantages of placing the solid state switch in proximity of the PWM controller while providing the heat sink capabilities and electromagnetic emission levels associated with locating the solid state switch in the motor housing.

It is a further object of the present invention to provide a trolling motor which provides the advantages of placing the switching components of the controller proximate the controller circuitry while providing the heat sink capabilities and electromagnetic emission levels associated with locating such components in the trolling motor housing.

It is still a further object of the present invention to provide a trolling motor controller which allows modular assembly of various models of trolling motors to reduce the number of individual inventory items required to produce such models.

SUMMARY OF THE INVENTION

The present invention provides a DC motor which includes a pulse width modulated motor controller housed within the motor housing. In a preferred embodiment the inventive motor includes: a motor housing; a motor housed within the housing having a motor shaft which extends through one end of the housing; and a motor controller housed within the housing to provide electrical power to the motor.

In another preferred embodiment the inventive motor and controller are incorporated in a trolling motor which further includes: a propeller nonrotatably attached to the motor shaft for propelling the boat; a support column extending from the motor housing and rotatably attached to a mounting bracket to allow steering of the boat when propelled by the trolling motor. Optional embodiments allow: speed control of the motor from a hand adjustment, a foot pedal, or an autopilot; manual or automatic steering; and intelligent control of the motor during weed fouling, or in other stall conditions.

Preferably the motor controller includes a solid state switch which drives the motor and which is in physical contact with the motor hosing to allow thermal conduction directly from the switch to the housing. Furthermore, the housing is preferably formed of a material having good thermal conductivity, such as aluminum, so that heat conducted from the switch is readily dissipated in environment, in particular, dissipated in the water in which the trolling motor is being used. Thus, virtually any amount of heat which could be produced by the switch can be transferred to the environment, limited primarily by the rate at which heat may be transferred from the switch to the housing.

As will be apparent to those skilled in the art, with both the switch and the controller located in the motor hosing, the signal produced to drive the switch will suffer little, or no, degradation as opposed to routing the signal from an external controller to the motor housing. Furthermore, the emission of electromagnetic interference will be substantially reduced over either of the traditional methods.

As is known in the art, it is often desirable to locate a sonar transducer on a trolling motor. Unfortunately, the placement of a sonar transducer on or near a trolling motor has been somewhat problematic with prior art motors due to electromagnetic noise associated with the operation of the motor. When the trolling motor has a PWM controller, the interference associated with the motor is of particular concern. The inventive system will substantially ease the difficulties involved with such a combination.

Another advantage of the present system lies in the modularity of a trolling motor produced according to the present invention. A motor with an integral controller simply becomes a modular unit which may be coupled with a manual steer head or an electric steer head, a hand speed control or a foot pedal, etc. By the same token, for example, a given manual steer head could be coupled to a motor of any torque rating or, similarly, an electric steer mechanism could be coupled to a motor of any torque rating. A manufacturer can simply choose between standard modular blocks to create an entire line of trolling motor models.

In one preferred embodiment, the motor controller is of the type described in U.S. Pat. No. 6,507,164, entitled "Current Based Power Management for a Trolling Motor", which is hereby incorporated by reference. By implementing the majority of control functions in software, the controller can be produced in a size conducive to placement in the relatively tight confines of the motor housing. In addition, such a controller may be used across a variety of motors having differing voltage and current requirements, even further reducing the level of inventory required to produce an entire product line.

Further objects, features, and advantages of the present invention will be apparent to those skilled in the art upon examining the accompanying drawings and upon reading the following description of the preferred embodiments.

BRIEF DESCRIPTION OF THE DRAWINGS

FIG. 1 depicts a preferred embodiment of the inventive trolling motor in its general environment.

FIG. 2 provides an elevation view of the motor housing of a preferred embodiment of the inventive trolling motor.

DESCRIPTION OF THE PREFERRED EMBODIMENTS

Figure 3:
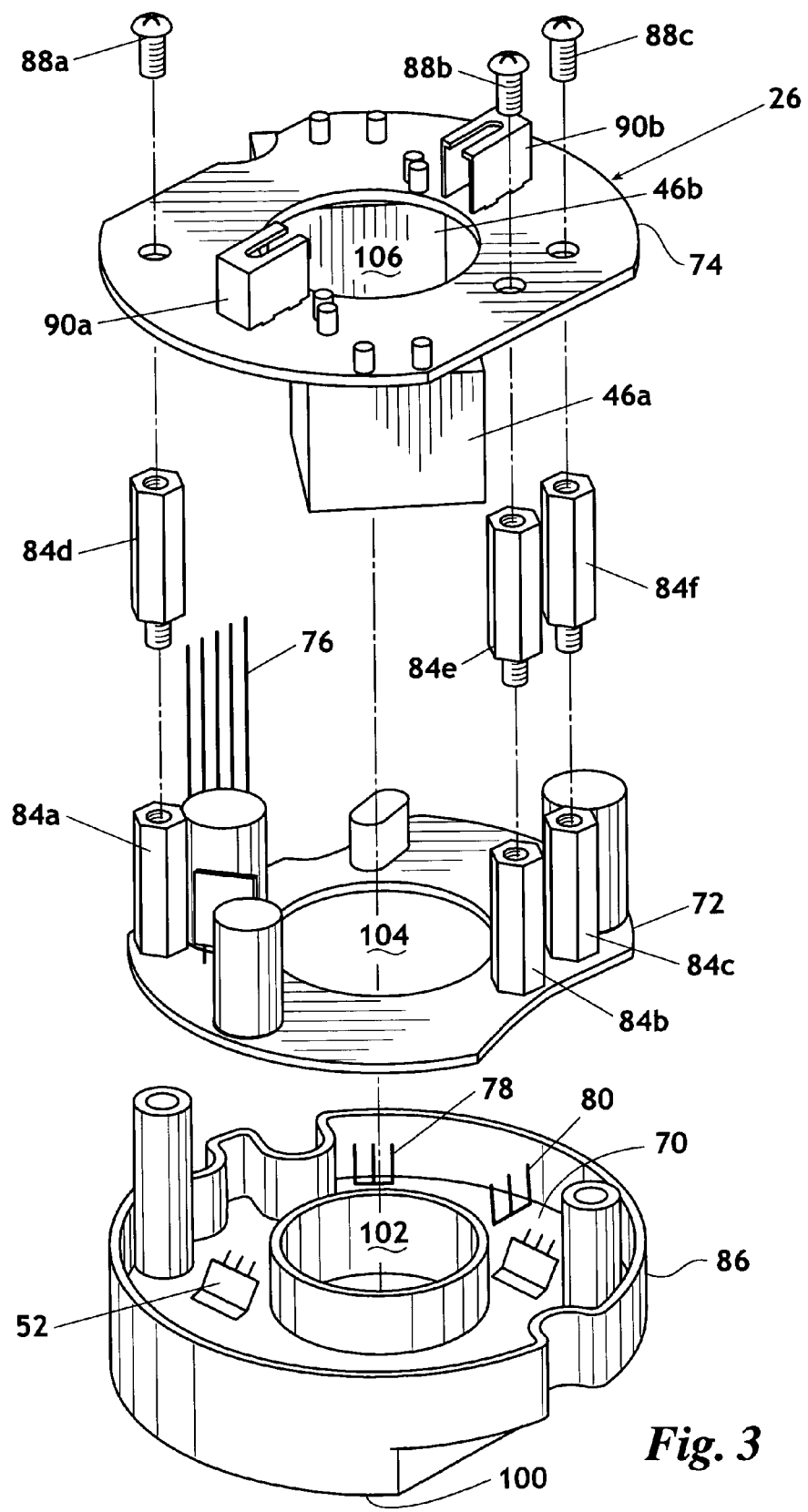
FIG. 3 provides an exploded perspective view of a preferred embodiment of the inventive motor controller.

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

Referring now to the drawings, wherein like reference numerals indicate the same parts throughout the several views, a trolling motor 10 having an intrgral, submerged controller is shown in its general environment in FIG. 1. Typically trolling motor 10 is rotatably mounted to a fishing boat 12 by a mount 14. Mount 14 allows the trolling motor to be placed in the water, as shown in FIG. 1, or to be laid on the deck of boat 12 for when not in use. Preferably, trolling motor 10 includes: head 16 which typically houses a steering mechanism and associated control circuitry, if motor 10 is so equipped; a support column 18 extending from head 16 downward through the mount 14 and into the water to support motor assembly 20 in a submerged position. Propeller 22 connects to motor assembly 20 to propel the boat. Fin 28 improves the steering performance of trolling motor 10 and protects propeller 22 from submerged obstacles. The trolling motor speed and steering control may be provided by a foot pedal 30, a hand control (not shown), an autopilot (not shown), or the like.

With further reference to FIG. 2, motor assembly 20 includes housing 24 which houses the motor 48 (FIG. 7) which in turn rotates propeller 22 and a controller assembly 26 for electrically driving the motor. Preferably, electrical wires (not shown) originate in head 16 and are routed through support column 18 to supply electrical power to controller 26 and ultimately to the motor 48. Preferably, controller 26 utilizes pulse width modulation (PWM) to control the voltage applied to the motor, and hence, to control the speed of the motor.

Figure 7:
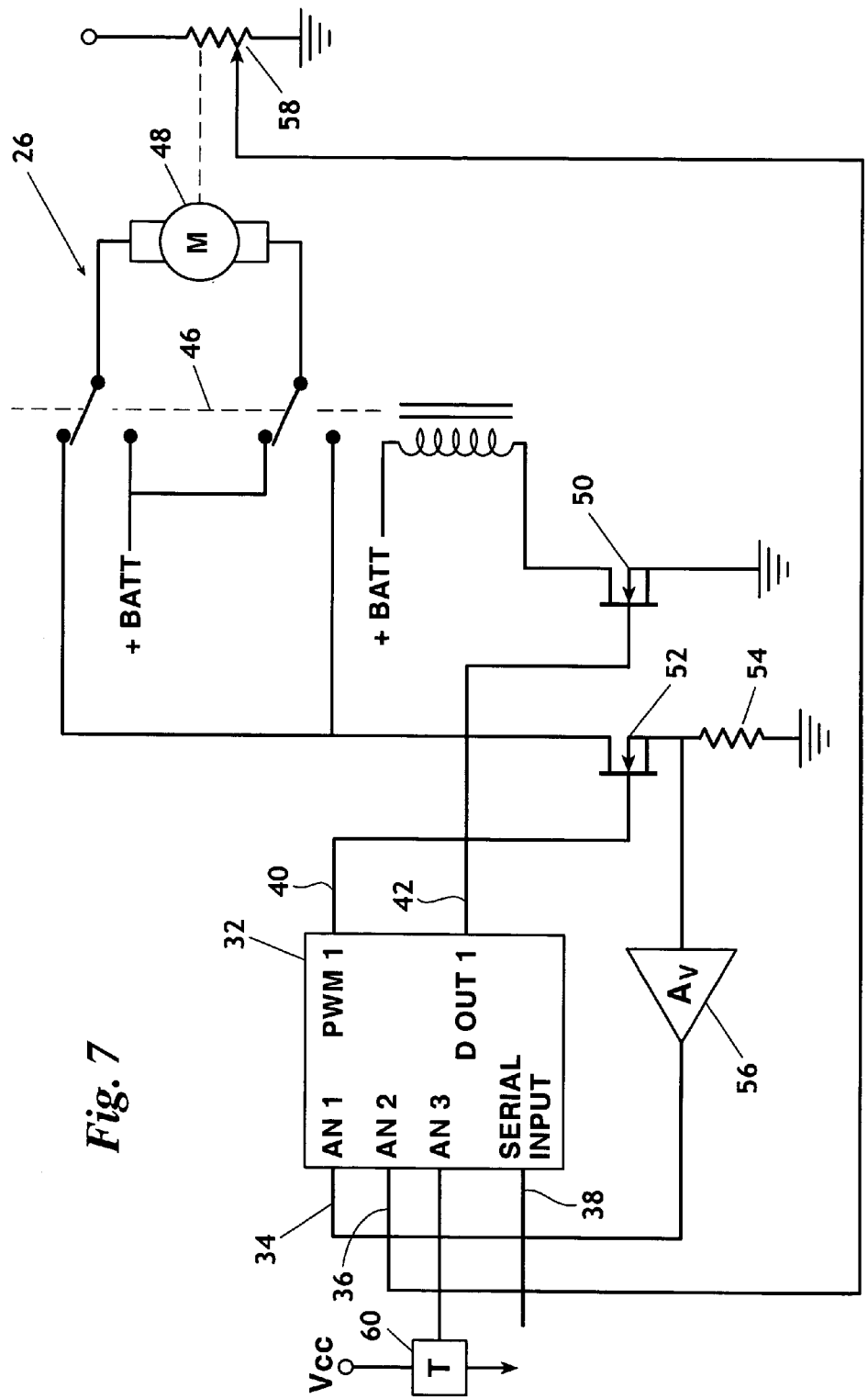
FIG. 7 provides a schematic diagram of a preferred motor controller employed in the inventive trolling motor.

Generally speaking, PWM controllers for trolling motors are well known in the art. An example of a PWM controller 26 suitable for use in the inventive trolling motor is shown in FIG. 7. Preferably, controller 26 possesses a number of desirable traits including: current management to protect the motor and controller in the invent of propeller fouling or other stall condition; minimal parts count to allow packaging of the controller in a relatively small volume; both analog and digital inputs for speed control to allow easy interfacing with a foot pedal, hand control, autopilot, and the like; adaptability to motors of various voltage and current requirements; etc. The motor controller 26 as shown in FIG. 7 possesses these traits and is further described in U.S. Pat.

No. 6,507,164, entitled "Current Based Power Management for a Trolling Motor," which is incorporated herein by reference.

Continuing with FIG. 7, preferably controller 26 comprises: microprocessor 32 having analog inputs 34 and 36, a pulse width modulator output 40, a digital output 42, and a serial input 38 for receiving motor speed commands from, for example, a foot pedal 30 (FIG. 1); reversing relay 46 for changing the polarity of the power applied to motor 48; relay driver 50 for energizing reversing relay 46 at the direction of output 42; solid-state switch 52 for energizing motor 48; and current sense resistor 54 and amplifier 56 for measuring the current flowing through motor 48. The output of current sense amplifier 56 is directed to analog input 34 such that the microprocessor 32 can monitor the current flowing through motor 48. Input 36 provides an alternate means for providing a motor speed command to controller 26 from an analog signal, i.e. a potentiometer 58.

In addition, motor controller 26 includes a thermistor 60, or other temperature sensing device, such that microprocessor 32 can monitor the temperature of motor 48. Should the temperature of controller 32 approach an upper threshold, preferably microprocessor 32 will decrease the drive to motor 48 to reduce the heat produced therein. Accordingly, controller 32 can, on a transient basis, drive motor 48 beyond its steady-state limits to provide high torque for maneuvering but gradually reduce the electrical drive to motor 48 to operate within its steady-state limits before motor 48 actually overheats.

As will be apparent to those skilled in the art, while controller 26 possesses a number of traits which are well suited to the present invention, other PWM controllers are also suitable for use with the present invention. In fact, any PWM controller which may be packaged in the confines of the motor hosing will fall within the scope and spirit of the present invention.

Referring next to FIG. 3, in the preferred embodiment, the various components of controller 26 are located on three circuit boards 70, 72, and 74. Connectors 76, 78, and 80 electrically interconnect the boards 70, 72, and 74. Spacers 84a–f separate boards 72 and 74 to provide clearance between the boards to accommodate the components mounted thereto.

As will be understood by those familiar with DC motor design, a trolling motor typically includes an armature (not shown) which includes a series of windings wound about an armature shaft. A commutator is mounted coaxial with the armature shaft and acts in concert with a pair of brushes to sequentially apply power to the windings of the armature as the motor rotates to continue urging rotation of the of the armature. By reversing the voltage to the brushes, and hence each winding, the direction of rotation of the armature may be reversed. With further reference to FIG. 7, reversing relay 46 performs the function of reversing the polarity of the power applied to the armature through the brushes. It should be noted that circuit board 74 includes brush housings 90a and 90b which both retain, and provide power to the, brushes (not shown). The brushes in turn interact with the commutator to power the windings of the armature. As a matter of design choice, two single-pole double-throw relays 92a and 92b are used to provide the double-pole double-throw function (as shown with relay 46 of FIG. 7) for reversing. As will be apparent to those skilled in the art, the output of controller 26 is provided directly to the brushes of motor 48 through circuitry provided on board 74 without the need for additional wiring between controller 26 and motor 48. This arrangement substantially reduces the opportunity for the emission of electromagnetic noise.

Preferably, the heat producing components, i.e., transistor 52, of motor controller 26 are mounted on circuit board 70. Preferably, circuit board 70 is of a heat-sinking type, such as direct copper bonded substrate or insulated metal substrate, and is positioned by board housing 86 to maintain contact for good thermal conduction from the heat producing components to the outer surface of controller assembly 26 (FIG. 2).

Figure 4:
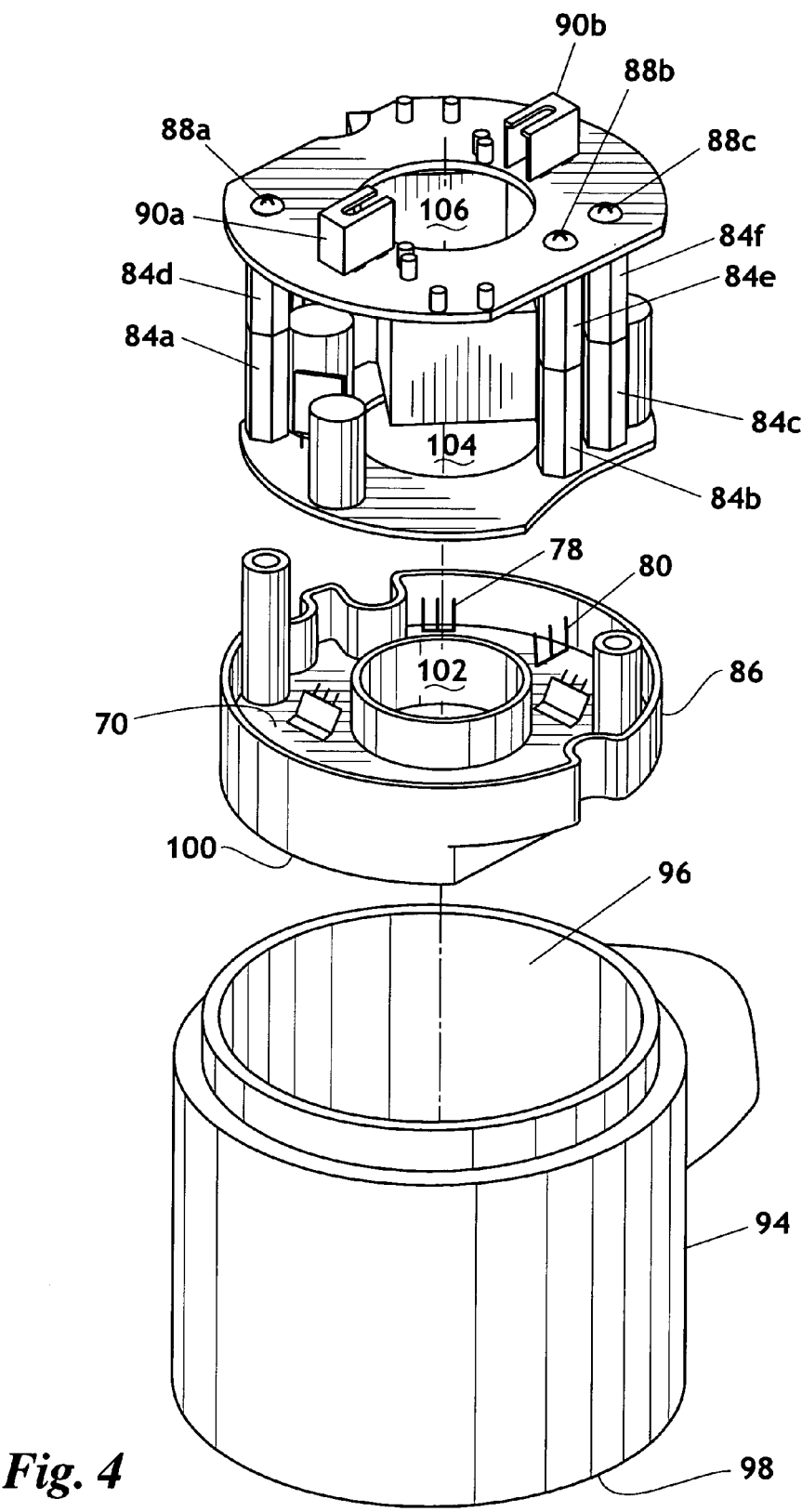
FIG. 4 provides an exploded perspective view of the motor controller showing the mating of the brush assembly and controller.
Figure 6:
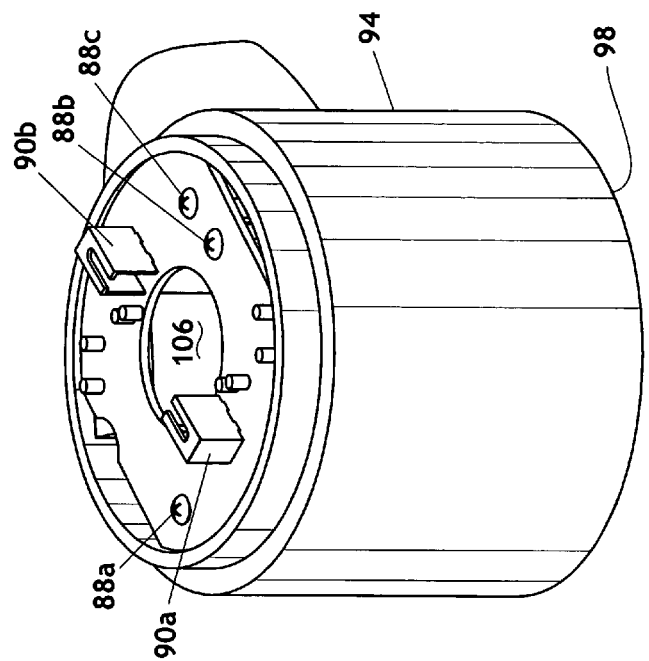
FIG. 6 provides a perspective view of the controller section of the motor housing.
Figure 5:
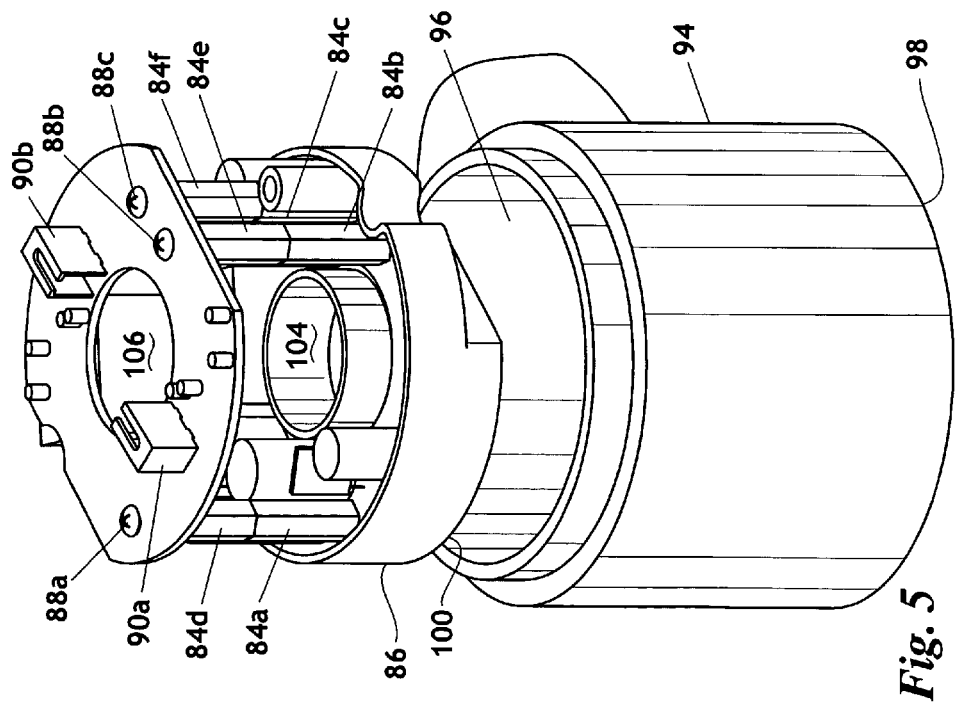
FIG. 5 provides an exploded perspective view of the motor controller in a further assembled state.

The remaining components of motor controller 26 are preferably located on board 72. With further reference to FIGS. 4, 5, and 6, screws 88a-c are received in spacers 84d–f, respectively to secure board 70 to board 72. Boards 72 is then received on connectors 78 and 80 of board 70 to form motor controller 26 which is, in turn, received in controller housing 94. Controller housing 94 includes a forward opening 96 for receiving controller assembly 26 and a rear bulkhead 98 which mates with heat sinking surface 100 of circuit board 70. Board 70 includes aperture 102, board 72 includes aperture 104, board 74 includes aperture 106, and bulkhead 100 includes an aperture (not shown) for passage of the armature shaft when the motor is assembled. When fully assembled, as shown in FIG. 6, the heat-sinking surface 100 (FIGS. 3 and 4) of board 70 is held in physical contact with the rear bulkhead 98 of housing 94 to provide thermal conduction between the heat producing components and the housing 94.

Preferably, controller housing 94 is formed of a material which is a good thermal conductor, most preferably, aluminum.

As will be apparent to those skilled in the art, in certain embodiments of the present invention, other heat producing electronic components may be included in the controller, i.e., voltage regulators, interface circuitry, etc. To the degree any of these components produce heat beyond that which can be readily dissipated in the free air surrounding the component, such components could likewise be located on circuit board 70 to provide thermal conduction to the environment.

It should also be noted that typically, the heat produced by controller 26 will be proportional to the load on the trolling motor. If the motor is operated out of water, the propeller will likely only be moving air, thus placing a relatively small load on the motor. In such a situation the amount of heat produced by controller 26 can be easily dissipated into the air surrounding the motor.

As will be apparent to those skilled in the art, in addition to providing a thermal conductivity path between the heat producing components of the controller and the underwater environment of the motor assembly, the inventive trolling motor locates all of the motor drive circuitry in proximity to the motor, thus dramatically reducing degradation of signals associated with motor control and electromagnetic emissions associated with pulse width modulated control of the motor. It will also be apparent to those skilled int the art that the steering circuitry may continue to be located in the trolling motor head, in close proximity to the steering motor.

Finally it should be noted that, while the preferred embodiment of the inventive motor/controller system has shown and described as incorporated into a trolling motor, the invention is not so limited. Typically the outside surface of a non-submerged motor is more than adequate to dissipate the heat produced by the motor. By constructing the housing of a DC motor from a material having good thermal conductivity, and locating the motor controller in the motor housing, with heat producing components in contact with the housing, it is possible to take advantage of the large exterior surface area in dissipating the heat of the switching components to dissipate the heat into the environment. In addition such placement of the controller will substantially reduce emissions of electromagnetic interference over prior art systems.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention.

What is claimed is:

1. A trolling motor comprising:
   a motor housing;
   a motor controller housed within said motor housing,
   wherein, when said trolling motor is in operation on a boat, said motor housing will be submerged in water; and
   wherein said motor controller includes an output driven by a solid state switch, said solid state switch being in thermal communication with said motor housing.

2. The trolling motor of claim 1 wherein said motor housing is formed of aluminum and wherein substantially all heat produced by said solid state switch is conducted to the water surrounding said motor housing when said motor housing is submerged.

3. A trolling motor comprising:
   a motor housing;
   a motor controller housed within said motor housing,
   wherein, when said trolling motor is in operation on a boat, said motor housing will be submerged in water; and
   wherein said motor controller includes a pulse width modulator.

4. The trolling motor of claim 3 wherein said motor controller further comprises an output driven by a solid state switch, said solid state switch being controlled by said pulse width modulator.

5. The trolling motor of claim 4 wherein said trolling motor further comprises a pair of brush housings and wherein said brush housings are integral with said motor controller.

6. A controller for a trolling motor comprising:
   a pulse width modulator;
   a solid state switch controllable by said pulse width modulator; and
   a pair of brush housings integral to said motor controller,
   wherein said solid state switch provides electrical power to at least one of said brush housings.

7. The motor controller of claim 6 further comprising a motor housing, said motor housing in thermal communication with said solid state switch and with the environment in which the motor controller is operating such that the majority of the heat produced by said solid state switch will be conducted to the environment through said motor housing.

8. The motor controller of claim 6 further comprising a motor housing, wherein said motor controller includes a plurality of heat producing components and wherein said plurality of heat producing components are in thermal communication with said motor housing such that a portion of the heat produced by said heat producing components will be conducted to the environment through said motor housing.

9. A DC motor comprising:
   a motor housing;
   a motor controller for controlling a permanent magnet or wound-field type DC motor housed within said motor housing, said motor controller having a solid state switch for driving the motor, said switch being in thermal communication with said housing.

10. The DC motor of claim 9 wherein said motor housing is formed of aluminum.

11. The DC motor of claim 9 wherein said motor controller includes a pulse width modulator in communication with said solid state switch such that the conductive and nonconductive states of said solid state switch are controlled by said pulse width modulator.

* * * * *